UNITED STATES PATENT OFFICE.

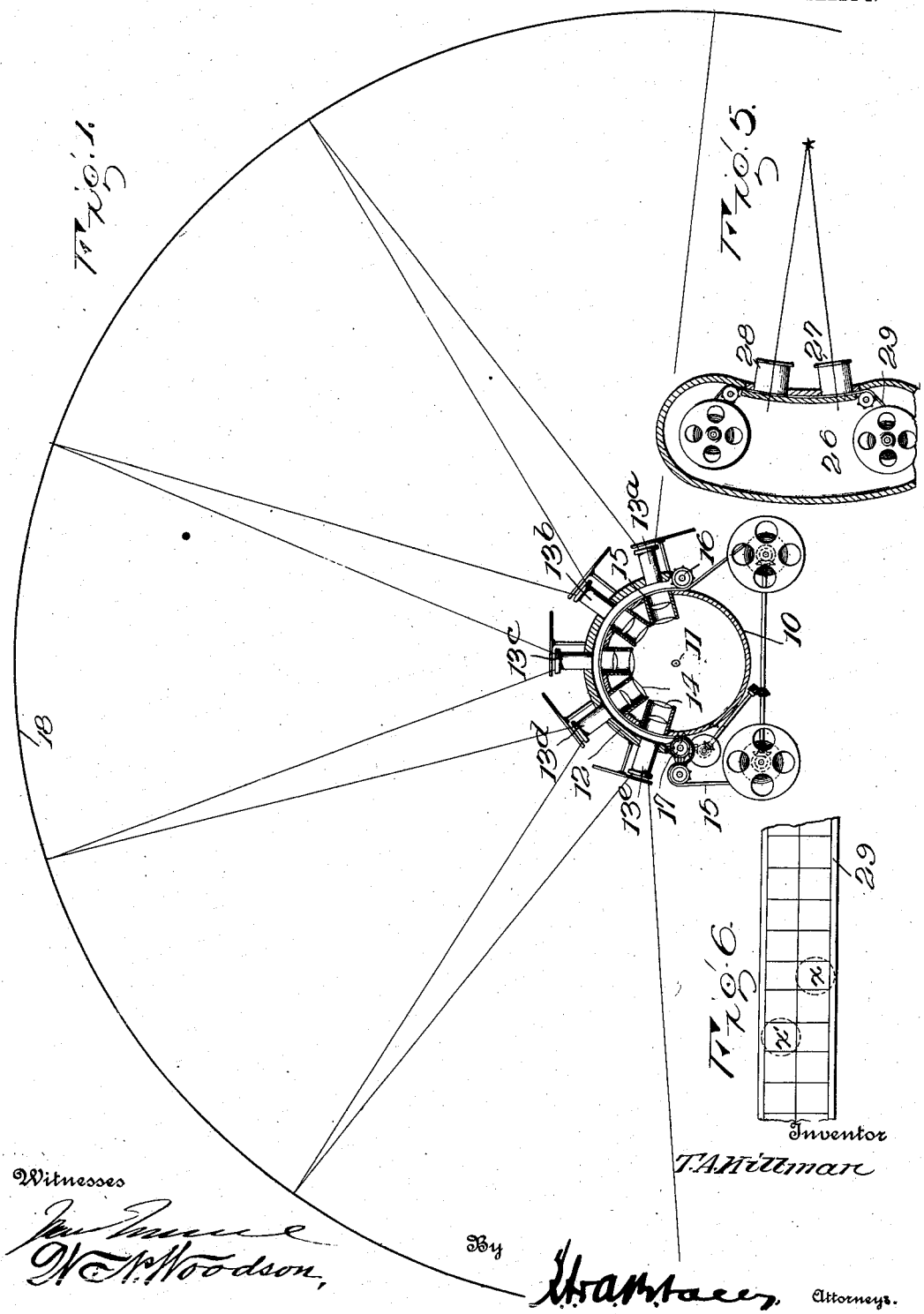

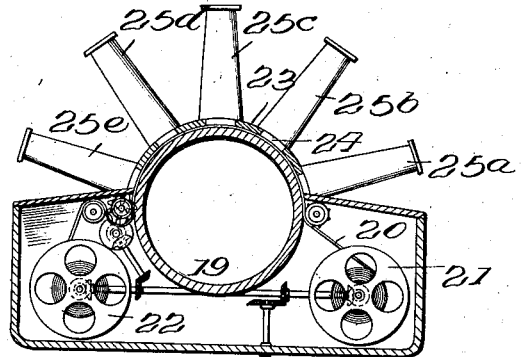
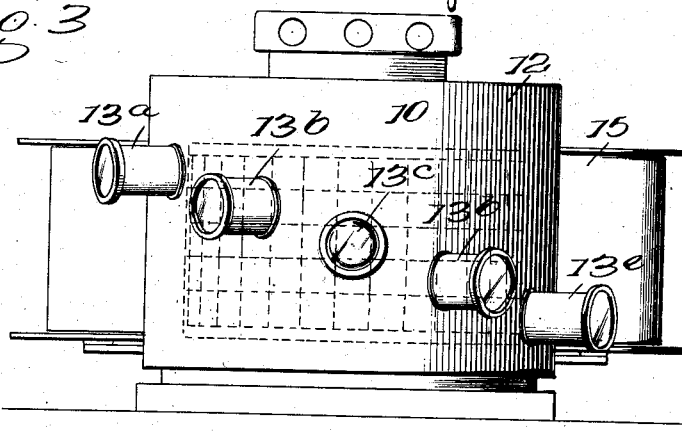
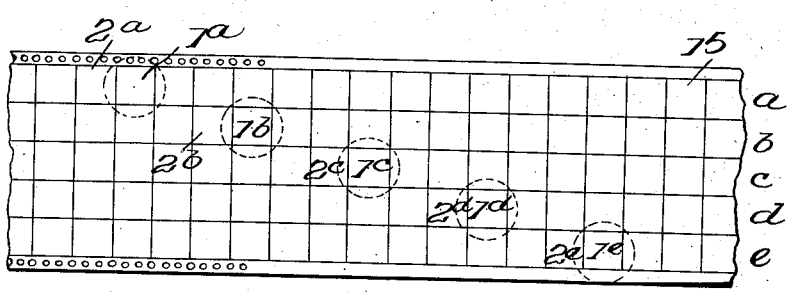

THOMAS A. KILLMAN, OF NASHVILLE, TENNESSEE, ASSIGNOR OF ONE-FOURTH TO E. H. ROY, OF NASHVILLE, TENNESSEE.

MEANS FOR TAKING AND PROJECTING MOVING PICTURES.

1,136,236.  Specification of Letters Patent.  Patented Apr. 20, 1915.

Application filed October 27, 1913. Serial No. 797,586.

*To all whom it may concern:*

Be it known that I, THOMAS A. KILLMAN, citizen of the United States, residing at Nashville, in the county of Davidson and State of Tennessee, have invented certain new and useful Improvements in Means for Taking and Projecting Moving Pictures, of which the following is a specification.

My invention relates to moving picture apparatus, and particularly to the manner in which moving pictures are to be taken or projected.

The primary object of my invention is to provide means whereby the "field" of a moving picture may be very greatly extended, and whereby panoramic moving pictures may be taken and projected.

A further object is to provide means for taking or projecting a plurality of series of moving pictures, all of the series being disposed upon one film.

A further object is to provide means whereby a plurality of series of correlated moving pictures may be taken simultaneously and simultaneously projected, each series covering a "field" different from, but related to, the "field" of any other picture.

A still further object of the invention is to provide means for the projection of moving pictures upon a screen disposed in the arc of a circle.

Other objects will appear in the course of the following description.

My invention is shown in the accompanying drawings, wherein:—

Figure 1 is a plan view of a moving picture projecting apparatus arranged in accordance with my invention; Fig. 2 is a plan view of a moving picture camera arranged in accordance with my invention; Fig. 3 is an elevation of either the camera or the projecting apparatus; Fig. 4 is a diagrammatic view of the moving picture film; Fig. 5 is a view illustrating diagrammatically a different arrangement of the camera and lenses thereof; and Fig. 6 illustrates a film adapted for use with the camera shown in Fig. 5.

Corresponding and like parts are referred to in the following description and indicated in all the views of the accompanying drawings by the same reference characters.

Referring to these drawings, and particularly to Fig. 1, 10 designates a lamp housing having an inner wall, shown as extending entirely around the lamp or other source of light 11, and having an outer wall 12 for a portion of its diameter, its outer wall 12 being concentric to but spaced from the inner wall.

Projecting radially from the outer wall 12 in spaced relation to each other are a plurality of lens housings 13$^a$, 13$^b$, etc., which inclose suitable projecting lenses. As will be seen from Fig. 1, these lens housings extend radially outward from the wall 12 of the lamp housing, each at a different angle from any other lens housing, and these several lens housings are arranged in stepped relation, so that each lens housing is on a different horizontal plane from any other lens housing. Means are, of course, provided whereby the lenses in each lens housing may be properly focussed, but this means is not part of my invention and, therefore, I have not illustrated any such means.

Extending inward from the inner wall of the lamp housing are a plurality of lens boxes 14, each containing the usual condensing lenses, whereby the light from the source 11 is condensed before it is passed through the film. Moving between the inner wall of the lamp housing and the wall 12 is a film 15 such as is usually used in moving picture apparatus, this film, however, being of a greater width than that ordinarily used, and in the instance shown having a width equal to five of the ordinary moving picture films, the lamp housing being illustrated as provided with five sets of projecting lenses.

Any suitable means may be used for shifting the film 15 through the space between the outer and inner walls of the lamp housing, and I have, therefore, illustrated the intermittently rotated sprocket rollers 16 and 17, the sprocket roller 16 being disposed at the entrance end of the lamp housing, while the sprocket 17 is disposed at the exit end of the lamp housing. It is to be understood that means are to be provided for shifting the film intermittently, step by step, before the lenses, and that any suitable or usual intermittent film feed may be used for this purpose. This feed mechanism has not been shown in detail, as the particular construction of the intermittent feeding mechanism forms no part of my invention. It is also to be understood that the usual shutters will be used in conjunction with each set of projecting lenses so as to occult the beams of light passing through the film while the film is being shifted, or permit the beams of light to pass onto the screen during the period the film is at rest. Inasmuch as the shutter mechanism is of the usual type, and forms no part of my present invention, I have not illustrated the same in detail.

As illustrated in Fig. 4, the film 15 is divided into a plurality of longitudinally extending picture spaces or sections. These sections are lettered respectively $a$, $b$, $c$, $d$ and $e$, the film shown being divided into five series of picture spaces to correspond with the five lens housings 13. Each of the picture spaces $a$, $b$, $c$, $d$ and $e$ is designed to contain a series of consecutive pictures, and the pictures of any one series are so arranged with relation to the pictures of any other series that when the film is threaded through the machine, a series of synchronously coincident pictures will be simultaneously projected through all of the several sets of projecting lenses. Thus picture 1 of the series $a$ will be projected through the set of lenses $13^a$; picture 1 of series $b$ will be projected through the lenses $13^b$; picture 1 of the series $c$ will be projected through the lenses $13^c$, and picture 1 of the series $d$ and $e$ will be respectively projected through the lenses $13^d$ and $13^e$. It will be seen that these picture spaces $13^a$, $13^b$, $13^c$, $13^d$ and $13^e$ on the lenses are arranged in stepped relation, and it will be also seen that by moving the film 15 toward the right one step, that is, the distance of one picture space, that the picture space $2^e$ will be brought before the lenses $13^e$; picture space $2^d$ will be brought before the lenses $13^d$, and the picture spaces $2^c$, $2^b$ and $2^a$ will be brought before the lenses $13^c$, $13^b$ and $13^a$, respectively. Thus the order of presentation of the pictures in any one series to the lens for that series is precisely the same as in the ordinary moving picture machine.

The series of pictures are projected preferably upon a screen 18 which is arranged concentric to the lamp house. The several sets of lenses are so arranged that the picture projected by one lens will slightly intersect and blend into the picture projected by the next adjacent lens, so that in the construction illustrated in Fig. 1, a continuous picture will be presented extending through a semicircle, the lines of demarcation between the pictures not being evident.

In Fig. 2, I show diagrammatically a moving picture camera which has essentially the same construction as the projecting apparatus. In this camera, I have illustrated a central cylindrical member, designated 19. This member has double walls, spaced from each other to permit the passage of a film 20. This film is unreeled from a magazine reel 21 and wound up upon a reel 22. The film is shifted step by step in the same manner as is done in ordinary moving picture camera and by like mechanism.

Disposed concentrically to the central member 19 is an outer wall 23 having a plurality of gates or apertures 24 from each of which projects a lens housing 25. These several lens housings $25^a$, $25^b$, $25^c$, $25^d$ and $25^e$ constitute several separate cameras, the fields of which successively intersect or combine at their margins. The several lens boxes 25 are arranged in stepped relation in the same manner as are the lens housings previously referred to. Thus the set of lenses $25^a$ corresponds in position to the set of lenses $13^a$ in the projecting apparatus; the set of lenses $25^b$ corresponds in position to the set of lenses $13^b$, and so on.

It will be obvious now that the fields of the several sets of lenses will be consecutive, and that the total field of the camera will have an angular extent of approximately 180°. It will thus be seen that the action of a moving picture may take place in a field having an angular extent of 180°, and that when the film upon which these pictures are taken is transferred to the projecting apparatus, there will be presented upon the screen a panoramic moving picture, the total field of which is, as before stated, approximately 180°. By this means, extremely realistic moving pictures may be shown with a field so extended as to permit of relatively close views of large numbers of actors, while in the relatively small camera field capable of being covered to-day by the usual camera, the actors must be a considerable distance away from the lens if any extended movement or if large numbers of actors are to be photographed. Instead of a relatively small section of background, a very large section may be taken; practically the same back-ground as would be seen by an observer of the action itself.

While I have illustrated the battery of lenses as being arranged to cover a total field of 180°, it will be obvious that a less field may be covered by using fewer lenses having a less angular distance between them, and that a greater field may be covered by using more lenses, and that it will be possible to take a picture which would cover or include a circular field of 360° and project this picture upon a circular screen. In both these cases, the camera and projecting apparatus would be disposed at the center of the circular field, and the effect on the spectator would be the same as in a scenic panorama, wherein the spectator is supposed to be at the center of action.

While I have referred heretofore to the use of the camera and of the projecting machine as being for the purpose of taking and projecting a panoramic moving picture consisting of a plurality of correlated sections, it is obvious also that my mechanism might be used for the purpose of taking and projecting a plurality of unrelated pictures. In this case, the screen 18 would receive five separate and distinct pictures, and each picture may be projected into a separate and distinct hall or theater, the partitions between two halls coinciding with the adjacent margins of the screen. Thus from one film five separate audiences might be entertained. In taking the pictures for such a film, there would, of course, be five separate and distinct moving picture plays going forward at the same time, one play for each of the sets of lenses in the camera. As an example of the advantages incident to my invention, we will suppose that a view is taken of a procession coming to and passing from a given point where the camera is located. The middle lens of the battery of lenses could be located very close to the line of marchers. Two of the lenses (supposing five to be used) would be extended toward that portion of the procession coming toward the camera, while the other two of the lenses would be extended toward that portion of the procession moving away from the camera. When such a picture was projected, the spectator would see exactly the same view as if he stood where the camera was placed; he would see the line of marchers coming toward him and gradually growing larger and would see them passing and then recede. Were any such picture attempted to be taken and projected today by the ordinary moving picture apparatus, the marching figures would necessarily be of extremely small size because the camera would have to be shifted to a considerable distance away from the line of march in order to secure a field of sufficient angular extent to take in not only those passing the axis of the lenses, but those coming toward the axis or receding therefrom.

Not only may my construction be used for the purpose of projecting panoramic pictures, but the principle of the construction may also be embodied in a machine for taking and projecting stereoscopic moving pictures. Thus in Fig. 5, 26 indicates a camera; 27 and 28 indicate two lens boxes arranged with their optical axes converging so that their fields will be practically coincident. Film 29 illustrated in Fig. 6, passes behind these lens boxes and will shift intermittently in the manner heretofore referred to and as commonly done with moving picture machines. This film 29 has two series of picture spaces, any one picture space of one series being arranged in stepped relation to the corresponding synchronously coincident picture space of the other series of picture spaces. Thus the picture space X in Fig. 6, is intended to be projected through the lenses 27, and is taken or projected at the same moment that the picture space X' is taken or projected, this picture space X' being behind the lenses 28, and the picture space X being behind the lenses 27. It will, of course, be understood that when projecting the pictures a source of light is used behind the film. Now, under these circumstances, it will be obvious that a compound picture will be projected upon the screen consisting of two pictures of the same field or object, one of these pictures being offset to the right or left from the other picture. Thus a stereoscopic effect will be secured. The two lenses will be set a very slight distance away from each other and, therefore, the pictures would differ from each other very slightly, only enough to secure the stereoscopic effect desired. It will be noted that no panoramic moving picture could be secured with one film unless the pictures were arranged upon the film in the manner indicated in Fig. 4, and the moving picture machines had a plurality of lenses in stepped relation to each other.

As before stated, I do not wish to limit myself to any particular mechanism for securing illumination, for shifting the film, for occulting or displaying pictures, or for supporting the camera or projecting machine, as none of these features form a part of my present invention.

What is claimed is:—

1. A moving picture apparatus including a casing, and a plurality of sets of lenses, each set of lenses being arranged on a different horizontal and different vertical line from any other set, the optical axis of each set of lenses having such an angular relation to the optical axis of any other set that the field of one set of lenses shall be spatially separated from the field of any other set.

2. A moving picture apparatus including a plurality of sets of lenses arranged in stepped relation, the optical axes of the lenses diverging outward, and means for feeding a picture film having thereon a plurality of series of picture spaces corresponding in number to the number of sets of lenses, intermittently past the lenses.

3. A moving picture apparatus including a plurality of sets of lenses arranged in stepped relation, the optical axes of the lenses on one side converging and on the other side diverging outward, so that the field of any one of said lenses shall approximately intersect the field of the next adjacent lens, and adapted to be used with a picture film having a plurality of series of picture spaces thereon corresponding to the number of sets of lenses, and means for causing an intermittent step by step feed of the film past the lenses.

4. A moving picture apparatus including a plurality of lenses arranged in stepped relation, the optical axes of the several sets of lenses diverging with relation to each other so that the field of each lens shall approximately intersect the field of an adjacent lens, and means for intermittently feeding a film before said lenses in the arc of a circle intersecting the inner ends of said lenses.

5. A moving picture apparatus including a casing and a plurality of sets of lenses arranged in stepped relation in said casing, the optical axes of said lenses diverging outward.

6. A moving picture apparatus including a plurality of sets of lenses arranged in stepped relation, and a source of light, the optical axes of said lenses radiating from said source of light.

7. A moving picture apparatus including a source of light, a plurality of sets of lenses arranged in stepped relation, the optical axes of the lenses radiating from said source of light, and means for shifting a moving picture film between said lenses and the light.

8. A moving picture apparatus for use with a moving picture film having thereon a plurality of longitudinally extending parallel series of picture spaces, including a plurality of sets of lenses radiating from a common center and means for intermittently shifting a film before said lenses, said lenses co-inciding each with one of said picture spaces and being spaced from each other vertically and laterally a distance equal to a certain number of spaces.

9. A moving picture film having thereon a plurality of parallel longitudinally extending series of pictures, the pictures of one series being co-incident in time but separated in space from the pictures of any other series, the pictures of one series being out of alinement both longitudinally and transversely with the synchronously co-incident pictures of any other series.

In testimony whereof I affix my signature in presence of two witnesses.

THOMAS A. KILLMAN. [L. S.]

Witnesses:
 ERNEST C. HARLAN,
 WM. C. HALL.